Patented Apr. 20, 1948

2,439,895

UNITED STATES PATENT OFFICE 2,439,895

TITANIUM OXIDE PIGMENT PRODUCTION

John Lewis Keats and James Howard Peterson, Wilmington, Del., assignors to E. I. du Pont de Nemours & Company, Wilmington, Del., a corporation of Delaware No Drawing. Application January 9, 1942, Serial No. 426,250

8 Claims. (Cl. 23—202)

This invention relates to the production of titanium oxide pigments, and more particularly to the preparation of improved rutile and/or anatase crystalline forms of such pigments having optimum values in respect to pigment hiding power and texture together with satisfactory reflectance (brightness), color or whiteness, tinting strength, oil absorption, etc.

More specifically, the invention pertains to the preparation of improved titanium oxide pigments having the characteristic lines of the rutile spectrum on X-ray analysis and to novel methods for their preparation by converting through heat treatment at relatively low calcination temperatures a substantially reduced or disintegrated form of precipitated raw pigment anatase.

Titanium oxide occurs in three crystalline modifications, namely, anatase, brookite and rutile. Of these, anatase and rutile comprise the forms most useful as pigments. Anatase has the lowest refractive index, while rutile possesses the highest refractive index, and therefore the greatest potential hiding power. Raw pigment anatase is derived from the hydrolysis of titanium sulfate solutions, while rutile may be obtained from the hydrolytic precipitation of titanium chloride solutions. When the washed, purified $TiO_2$ hydrolysate or raw pigment precipitate from such titanium salt solutions as the sulfate, chloride, nitrate, etc., is calcined at temperatures ranging from about 750–1000° C., a suitably developed pigment product results.

Although anatase has the lowest refractive index, most present-day commercial $TiO_2$ pigments are characterized by that modification. It appears that more economical and commercially attractive procedures are available for this type of pigment, since, as is well-known, the sulfate solutions employed in its manufacture are less corrosive towards plant equipment and are readily obtained from sulfuric acid attack upon titaniferous ores, such as ilmenite. Rutile production from chloride solutions, on the other hand, requires an extremely difficult and costly type of operation in which it is necessary to exercise careful controls at all times. In view thereof and the additional consideration that chloride solutions are highly corrosive in character and cause considerable damage to plant equipment, the relatively expensive operation required for obtaining rutile therefrom has caused such processes to become considerably less attractive for wide commercial exploitation.

If hydrous titanium oxide, such as that recovered from the hydrolysis of a titanium sulfate solution, is calcined in the temperature range of from about 950–1000° C., pigment anatase is produced. If, however, said calcination is conducted at substantially higher temperatures, and from about, say, 1025–1050° C. or above, the resulting product will comprise substantially rutile. Many processes have been already proposed which have as their primary object conversion of anatase and production of rutile in this fashion. In such instances, however, and because of the exceedingly high temperatures required, the potentially higher hiding power and tinting strength of the higher refractive index modification are not realized. These excessively high temperatures cause objectionable sintering, undesired growth in pigment particle size, and grit and aggregate formation, all of which is reflected in the relatively poor color, brightness, texture, tinting strength and hiding power of the ultimate pigment. The final product is therefore often wholly unfit for many intended uses and especially in coating compositions, such as paints, enamels and lacquers, wherein it is essential that the pigment component possess the characteristics above referred to. Accordingly, these disadvantages present a very serious drawback to the adoption of high temperature calcination conversion methods for the production of rutile.

Optimum hiding power, tinting strength and texture values for a calcined or finished titanium oxide pigment depend upon the relative uniformity and average particle size of the pigment itself; and when the pigment is incorporated in coating compositions, the paint film color will be found to be even more sensitive to particle size. The particle size of a titanium oxide pigment varies with, and is dependent upon the size of the raw pigment from which it is prepared as well as upon the calcination treatment accorded the raw pigment during its development. The precipitated raw pigment or so-called filterable secondary particles recovered after hydrolysis of a titanium salt solution comprise united or agglomerated groups of relatively nonfilterable or primary particles ranging in average size from about 2 to 20 millimicrons. For instance, the anatase raw pigment obtained from the hydrolysis of a relatively concentrated titanium sulfate solution may be made up of secondary aggregates comprising many of such finer particles. When this hydrolysate is treated, as is customarily done, with a small amount of alkali metal salt to improve the softness and uniformity characteristics of the finished product (as contemplated in U. S. patent to Blumenfeld 1,892,693) and then calcined at temperatures sufficient to completely convert the anatase to rutile, it will be found that during the conversion a rapid increase in size takes place and a value of approximately 300 millimicrons particle radius may ultimately exist in the completely converted product. From the standpoint of development of optimum hiding power, optimum particle size is of a lower order than 300 and preferably from about 140–225 millimicrons.

Since optimum particle size is essential to optimum hiding power and other necessary titanium oxide pigment properties, many processes have been proposed for improving unsatisfactory particle size. In general, these contemplate prolonged wet or dry grinding, disintegration or centrifuging of the titanium oxide after its calcination and development. Similarly and for the same purpose, dispersion of the calcined pigment, followed by recovery for use of the finer fractions through classification, has been also proposed. None, however, has proved completely effective or satisfactory. At the most the grinding operations have only succeeded in making very minor reductions, while the dispersion methods have been effective only in separating the particles of various sizes which may be bound together in aggregates, and not in reducing the size of the particles themselves.

A long-felt need has thus existed for a method which enables one to readily produce titanium oxide pigment having optimum values in respect to particle size and within a definite and prescribed optimum range, whereby such product inherently possesses optimum hiding power, tinting strength, texture and other essential pigment values; for a useful process from which this type of product is readily obtainable without recourse to the prolonged, unsatisfactory, costly, and time-consuming grinding and separatory operations which have characterized prior titanium oxide pigment manufacture; and for a process in which conversion of anatase to the higher (rutile) modification can be readily effected without resort to previously required high temperature calcinations and their attendant deleterious effect upon essential properties of the final pigment.

It is among the objects of this invention to overcome the foregoing and other disadvantages inherent in prior titanium oxide pigment production and to provide novel and useful methods for attaining these ends. A particular object of the invention is to provide a highly useful process for producing an improved anatase or rutile titanium oxide pigment having improved durability and weather-resistant characteristics, as well as optimum values in respect to uniform, average particle size, hiding power, tinting strength, texture, color and brightness, etc. Special objects of the invention include the provision of a novel method for manufacturing an improved rutile titanium oxide pigment inherently possessing these optimum values by converting precipitated raw anatase pigment at relatively low calcination temperatures, e. g., well below those heretofore considered necessary, in order to obviate the disadvantages attending such previous high temperature conversion methods; to provide a process by which rutile pigments of satisfactory color and with particle size in the range required for high hiding power can be obtained from the raw pigments produced in the commercial manufacture of anatase $TiO_2$ pigments; and, since the optimum particle size for development of high hiding power in the higher refractive index, rutile, is lower than the optimum for anatase, to provide a method of reducing the size of the secondary aggregates in the hydrolysis precipitate so that after calcination the finished pigment will be in the proper range of particle size. Other objects and advantages will be apparent from the ensuing description of our invention.

These and other objects are attainable in our invention which embraces the discovery that the properties of a finished, calcined titanium oxide pigment, especially the higher, rutile modification thereof, may be considerably improved if the raw pigment precipitate or hydrolysate from whence said pigment is derived is subjected, prior to heat treatment or calcination to develop essential pigment properties, to suitable particle size reduction or disintegration by mechanical or equivalent means of treatment, and that the subsequent calcination of the reduced or disintegrated raw pigment results in the right degree of particle size growth and provides a final pigment having an average particle size in the range most suitable for optimum hiding power, tinting strength, paint film color, and other essential anatase or rutile pigmentary properties. We have discovered further that if the anatase precipitate or hydrolysate from a titanium sulfate solution comprises the raw pigment so subjected to reduction or disintegration, its conversion to rutile upon subsequent calcination can be effected at a lower temperature than that required for raw pigments not so processed, and that the final $TiO_2$ pigment will likewise exhibit optimum values in respect to particle size, hiding power, tinting strength, color, texture, etc.

In its broader aspects, therefore, the invention comprises subjecting a $TiO_2$ raw pigment to mechanical or like disintegration treatment to reduce the raw pigment particle size and then subjecting the disintegrated product to calcination to develop its essential pigment properties.

More specifically, the invention comprises subjecting raw pigment anatase to suitable reducing or disintegrating treatment to reduce the particle size thereof, and then calcining the resulting product to develop its pigment properties.

In a preferred embodiment, the invention comprises preparing our improved rutile titanium oxide pigment by subjecting raw pigment anatase, obtained from the hydrolysis of a titanium sulfate solution, to mechanical disintegration treatment to reduce the particle size of said raw pigment, and then calcining the resulting product, in the presence of a small amount of a titanium-oxygen compound rutile conversion promoter.

The invention will now be described as applied to certain specific and preferred embodiments thereof in which raw pigment anatase, from conventional titanium sulfate solution hydrolysis, is treated in accordance with the invention and is then calcined to effect its conversion to rutile. Obviously, the invention is not limited thereto but may be beneficially applied to the treatment of all types of $TiO_2$ raw pigments, whether in the anatase or rutile crystalline form, whether derived from the neutralization or hydrolysis of other forms of titanium salt solutions, such as the nitrate, chloride, oxalate, etc., and whether the final pigment comprises anatase or rutile, or consists of a mixture of both crystalline forms.

In accordance with one specific adaptation, a relatively pure, previously-washed anatase precipitate, obtained from the hydrolysis of a titanium sulfate solution in accordance with, for instance, the procedures of U. S. Reissue Patent 18,854, or U. S. Reissue Patent 18,790 while in relatively wet or dry state and prior to heat treatment to develop its pigment properties, is subjected to mechanical milling, grinding, pulverizing or extrusion treatment to disintegrate or reduce its particle size and substantially reduce the size of its secondary particles or aggregates. Conveniently this may be accomplished by employing conventional types of grinding, milling, pulverizing or extruding media designed to disintegrate solid material or particles. Among examples of such type of media may be mentioned mills of the ball, pebble, rotary hammer, ring-roll or edge-runner type, squirrelcage disintegrators, micronizers, micropulverizers, or various extruding or ejecting apparatus designed to exert a relatively high fluid or mechanical pressure upon a body of the raw pigment being ejected. One or more of the following modes of treatment may be resorted to for accomplishing said disintegration: (1) wet milling, (2) dry milling, (3) dry milling followed by wet milling or vice versa, (4) ejection or extrusion under relatively high pressure of an aqueous slurry of the raw pigment through a relatively small opening or restricted orifice, and (5) passing an aqueous slurry of the precipitate through a colloid mill of the cone type or in similar types of mills, wherein a very small clearance between the stator and rotor members is maintained. Preferably, the disintegration treatment is sufficiently severe and prolonged as to substantially reduce the size of said secondary aggregates and insure, upon subsequent calcination of the reduced raw pigment, procurance of a final product which will exhibit optimum particle size, hiding power and tinting strength values.

In disintegrating the raw pigment by wet milling, an aqueous slurry of the pigment may be conveniently ground in the milling device. In instances of pebble mill use, the raw pigment may be ground for a period of from about, say, 1 to 4 hours or up to as high as 64 hours, a suitable water-to-pigment ratio employed during such milling being about 4 to 1. Alternatively, the pigment may be first dried (at temperatures ranging from about 50–200° C.) and then ground dry in the mill, a preferred procedure in this type of operation comprising dry grinding the pigment, adding the water and then grinding the resulting wet slurry for an additional period. Thus, the mill may be first filled with pebbles to the extent of, say, about 25–50% of its volume, the dried raw pigment may be then added and ground for a period of from about 1 to 4 hours. Thereafter, the mill may be opened, sufficient water introduced therein to provide a slurry containing about 300 g. $TiO_2$ per liter, and the resulting wet slurry may be then ground for an additional 1–4 hour period, or longer, if desired.

In producing mechanical disintegration by high pressure ejection or extrusion, an aqueous slurry of the raw pigment, containing about 250 g. $TiO_2$ per liter, may be placed in a suitable vessel or container capable of withstanding relatively high pressures and of the order of about 15,000 pounds per square inch. The vessel or container so employed is preferably equipped with a valve control leading to a gas reservoir and a restricted orifice or valve-controlled outlet, through which the contents of the vessel can be forced under any given or desired pressure. Gaseous fluid such as air, hydrogen, steam, etc., is forced into the reservoir under pressure and the free space in the vessel containing the pigment is brought to the same pressure as the reservoir. The outlet valve is then slowly opened or cracked so that the aqueous slurry is forced from the vessel or tube through the smallest opening possible. In lieu of extruding the raw pigment from a vessel containing the same through a restrictive orifice by means of applied fluid pressure, mechanical means, such as a piston, pressure roller or similar equipment may be employed in lieu of the gaseous pressure in order to forcibly remove or eject the pigment from a container and effect its reduction. For example, an aqueous suspension of precipitated $TiO_2$ may be introduced into a cylindrical drum having one or more converging narrow throats or restricted discharge outlets, towards, against and through which the precipitate will be forced by a suitably actuated piston or roller means likewise disposed within the container or drum.

After effecting desired reduction, the disintegrated product, if obtained from wet milling, may be suitably dewatered and then calcined to develop essential $TiO_2$ pigment properties and substantially completely convert the same to rutile, if the raw pigment under treatment comprises anatase. In instances where the raw pigment is dry milled, calcination treatment can be effected directly following milling. Prior to such calcination, a small amount (about .5 to about 1% on the $TiO_2$ basis), and in accordance with the teachings of Blumenfeld Patent No. 1,892,693, of an alkali metal salt, particularly sodium and/or potassium sulfate, may be incorporated in the disintegrated product and the resulting mixture then calcined. The calcined product is then subjected to the usual pigment finishing operations, after which it becomes adaptable for use in all pigment applications, and in those fields where white pigments are employed, such as in interior and exterior coating compositions, particularly in paints, enamels, lacquers, linoleum, and similar products, and in paper and rubber compounding, rayon or other artificial silk delustering, and in various other fields. Because of its relatively high hiding power and pigment density, our finished pigment, especially if in the rutile form, will be found to be particularly useful wherever formulations are required which employ relatively low pigment volumes.

In a preferred adaptation of our invention and to obtain a rutile pigment having exceptionally high hiding power and tinting strength as a final product, we conveniently mix with the raw anatase pigment, before or after the contemplated disintegration of said raw pigment by milling treatment, a relatively small amount of a $TiO_2$ seeding or catalyzing agent designed to promote anatase conversion to rutile during calcination. Useful seeding agents for the purpose comprise precipitated raw rutile prepared from titanium chloride solutions or some form of hydrous $TiO_2$ which, when calcined alone, converts to rutile at a substantially lower temperature than that at which the anatase raw pigment converts when calcined alone. Thus, specifically useful types of rutile promoters comprise precipitated raw rutile obtained from the hydrolysis of a titanium chloride solution, in accordance with the procedures of U. S. Patent 2,062,133, or the hydrolysates obtained according to the disclosure of the co-pending and now abandoned applications of John L. Keats, et al., Serial No. 283,052, filed July 6, 1939 (now continuation-in-part application Serial No. 500,148, filed August 26, 1943), and Ser. No. 283,051, filed July 6, 1939. The amount of rutile promoter to be used is, as already stated, relatively minor and may range, for instance, from substantially 1–25 parts of rutile per 100 parts of anatase, a highly useful concentration being from about 2–10 parts of rutile for each 100 parts of anatase present. After admixture of the raw pigment anatase and rutile promoter has been effected, the resulting product is milled or otherwise disintegrated to reduce the particle size thereof and the ground mixture may be then dried at about 100° C. and further ground in a pebble mill for a period of about 2–4 hours. Sufficient water is then introduced into the mill to provide a $TiO_2$ slurry of about 275 g./l. and the grinding continued for another period of about one hour. In such instances, the temperature of conversion to rutile on subsequent calcination will be found to be much lower than that of the seeded anatase after wet grinding alone.

To obtain a pigment having optimum values in respect to color and brightness as well as improved softness and uniformity characteristics, we prefer, after incorporating the rutile promoter or seeding agent in the reduced anatase raw pigment, or after an anatase raw pigment-rutile promoting agent mixture has been suitably disintegrated, and prior to calcination, to mix with said material a small amount of a mixture comprising an alkali metal salt, particularly sodium and/or potassium sulfate and certain polyvalent metal compounds adapted to yield white, insoluble oxides (in accordance with the disclosure of the copending application of James H. Peterson, Ser. No. 426,249, filed January 9, 1942, now Patent No. 2,369,246), and then calcine the treated, disintegrated raw pigment at temperatures ranging from substantially 750° C. to not in excess of about 1000° C. (and preferably from 850° C. to 975° C.) to develop essential pigment properties and substantially completely convert the anatase to rutile. The calcined product may be then subjected to the usual pigment finishing operations, after which it is adapted for use in all types of pigment application, especially those mentioned.

To a more complete understanding of the invention, the following specific examples are given, each being given by way of illustration but not in limitation of our invention:

Example I

This example relates to wet grinding anatase raw pigment in a pebble mill.

Anatase raw pigment prepared by following the procedures of U. S. Reissue Patent 18,854 to Blumenfeld was slurried with water to give a suspension containing 250 grams $TiO_2$ per liter. The slurry was then ground for 16 hours in a pebble mill containing pebbles ½ to ⅝ inch. The apparent volume of the balls in the mill was 35% of mill capacity and the volume of the balls plus charge was 55% of mill capacity. The particle size of the ground raw pigment was substantially lower than that of the unground product as is shown by the following data:

Average radius
Unground raw pigment_____ 284 millimicrons
Raw pigment ground 16 hrs_____ 231 millimicrons When the above two products were calcined at the lowest temperature which gave complete conversion to rutile, the ground product was considerably lower in particle size than the unground product and complete conversion to rutile was found to result at a substantially lower temperature, as shown by the following data:

| Grinding of Raw Pigment | Calc. Temp. | Per Cent Rutile | Average Radius Calcined Product |
|---|---|---|---|
| | | | Millimicrons |
| None | 1,025 | 100 | 313 |
| Wet ground 16 hours | 1,000 | 100 | 215 |

Example II

Anatase raw pigment prepared by a commercial process following the procedure disclosed in U. S. Re. 18,854 to J. Blumenfeld was seeded with raw rutile in the ratio of one part rutile by weight to 10 parts anatase by weight. The raw rutile was prepared by hydrolysis of titanium chloride solution by a procedure similar to that disclosed in U. S. 2,062,133 to P. Kubelka and J. Srbek. The two components were mixed as thick slurries and the concentration of the mixture adjusted to 250 grams $TiO_2$ per liter. The slurry was ground for a period of 64 hours in a pebble mill containing pebbles of diameters ½ to ⅝ inch under the same conditions of mill charge as are outlined in Example I. The ground product was characterized by particle size lower than the original anatase raw pigment as is shown by the following data:

Average radius
Seeded anatase raw pigment-not ground _____ 284 millimicrons
Seeded anatase ray pigment-wet ground 64 hrs _____ 213 millimicrons The reduction in particle size of the raw pigment caused by grinding carried through to the calcined pigment and gave a finished product of smaller particle size and considerable higher tinting strength than was obtained by calcination of the unground control raw pigment. The ground product substantially completely converted to rutile at a lower temperature than the unground product.

| Grinding of Seeded Raw Pigment | Calc. Temp. | Per Cent Rutile | Average Radius Calcined Product | Tinting Strength |
|---|---|---|---|---|
| None | 1,025 | 100 | 313 | 156 |
| Wet Ground 64 hrs | 1,000 | 100 | 210 | 176 |

Example III

Anatase raw pigment in the form of a wet filter cake was mixed with a slurry of raw rutile to give a suspension containing 286 grams $TiO_2$ per liter and containing rutile and anatase in the ratio of 1 to 20. The suspension was placed in a porcelain pebble mill containing sufficient coarse sand (20–30 mesh) as a grinding medium to fill about 50% of the volume of the mill. The volume of suspension was slightly more than sufficient to fill the voids. The mill containing the charge was rotated in a standard pebble mill frame for a period of 16 hours. The finished rutile pigment obtained by salt treatment with small amounts of sodium and potassium sulfate and calcination of the sand-ground seeded raw pigment was characterized by lower particle size and substantially higher tinting strength than the product obtained by similar treatment of the raw pigment without grinding. The average radius of the sand-ground product after calcination at a temperature of 975° C. to give substantially complete conversion to rutile was 199 millimicrons and the tinting strength was 187.

*Example IV*

Anatase raw pigment prepared as described in Example I was mixed with rutile raw pigment in the ratio of one part rutile to 10 parts anatase by weight. Particle size measurements by the spectral transmission method indicated that the average radius of the mixture was 331 millimicrons. The mixture of anatase and rutile raw pigments was dried at 110° and then ground dry in a pebble mill in which the balls occupied about 35% of the mill capacity. The ground product was calcined at 950° C. to convert to rutile. Particle size measurements on the calcined rutile product indicated that the average radius was 196 millimicrons. Products obtained by calcination of similar seeded anatase raw pigments without the dry grinding step preceding the calcination have shown average radii of above 300 millimicrons.

*Example V*

Anatase raw pigment from the same lot as that described in Example I was mixed with raw rutile prepared by the hydrolysis of titanium tetrachloride in the ratio of one part rutile to 10 parts anatase by weight $TiO_2$. The raw pigments were mixed as wet slurries and the mixed suspension filtered and the cake dried at 110° C. The dried mixture was placed in a porcelain ball mill containing porcelain balls equal in volume to 25% of the capacity of the mill. The product was ground for a period of three hours in the dry form after which water equal to three times the weight of the dried pigment was added and the wet mixture ground for one hour. The processed raw pigment was mixed with a solution containing $Na_2SO_4$ equivalent to 0.15% and $K_2SO_4$ equivalent to 0.60% of the $TiO_2$ in the mixture, and the product dried at 110° and then calcined at 975°. The calcined pigment was entirely in the rutile crystal form. Particle size measurements were made by the spectral transmission method after the customary wet grinding treatment following calcination. Marked reduction in particle size of the finished pigment was brought about by the dry plus wet grinding of the raw pigment as is shown in the tabulation below, in which data relating to a control raw pigment which did not receive the dry and wet grind but was treated the same in all other respects are given for comparison:

| No. | Grinding of Raw Pigment | Calc. Temp. | Per Cent Rutile | Average Radius | Tinting Strength |
|---|---|---|---|---|---|
|  |  |  |  | *Millimicrons* |  |
| 1 | None | 1,050 | 98 | Above 500 |  |
| 2 | 3 hrs. dry and 1 hr. wet. | 975 | 100 | 157 | 166 |

*Example VI*

Anatase raw pigment prepared as described in Example I was mixed with rutile raw pigment prepared from hydrolysis of titanium tetrachloride solution to give a suspension containing 275 grams $TiO_2$ per liter and containing one part rutile for 10 parts anatase. The suspension was placed inside a vertical silver-lined steel bomb tube capable of withstanding high pressures. The bomb tube was connected at the upper end with a tube leading to a hydrogen compressor and was equipped with an outlet valve at the bottom. Hydrogen was forced into the free space within the bomb above the suspension to give a pressure within the bomb of 7500 pounds per square inch. A valve on the lead-in tube was then closed. The outlet valve at the bottom of the bomb was then opened very slightly and the slurry was ejected through the small opening. The slurry before ejection occupied half of the space in the bomb. The pressure during ejection therefore decreased from 7500 pounds to about half this amount. The ejected slurry was then placed in the bomb again and the process repeated until 5 ejections were completed on the material. The ejection treatment effected substantial reduction in particle size of the raw pigment and this reduction was reflected in lower particle size and higher tinting strength of the product after calcination. This is shown by the following tabulation:

| Ejection of Seeded Raw Pigment | Average Radius Seeded Raw Pigment | Average Radius of Product Calcined to Give Complete Conversion to Rutile |
|---|---|---|
|  | *Millimicrons* |  |
| None | 238 | Above 270 |
| 5 Successive Ejections at 7500 pounds/sq. in. | 152 | 181 |

*Example VII*

Anatase raw pigment, prepared as described in Example I, was mixed with rutile raw pigment prepared by hydrolysis of titanium tetrachloride to give a suspension containing 210 grams $TiO_2$ per liter and containing rutile and anatase in the ratio of 1:10. The mixed slurry was placed in a bomb capable of withstanding high pressures.

The bomb was mounted vertically, the upper end being connected with a hydrogen compressor, and a storage reservoir was between the compressor and the bomb. An outlet valve was provided at the lower end of the bomb. After placing the charge in the bomb the compressor was operated until the pressure within the bomb and reservoir was 15,000 pounds per square inch. The line connecting the compressor and reservoir was then closed but the line connecting the bomb with the reservoir was left open. The valve at the bottom of the bomb was opened very slightly and the gas within the bomb and reservoir forced the mixed slurry through the small orifice under the constant pressure of 15,000 pounds per square inch. Substantial reduction in particle size of the raw pigment was caused by the single ejection at this pressure. The ejected product after calcination at a temperature which effected substantially complete conversion to rutile was also subtantially lower in particle size than a similar product which had not received the pressure ejection but which had been treated the same in all other ways. Data are given in the following tabulation:

| Ejection of Seeded Raw Pigment | Average Radius Seeded Raw Pigment | Calcination Temp. Required to Give Conversion to Rutile | Average Radius Calcined Product | Tinting Strength Calcined Product |
|---|---|---|---|---|
| | Millimicrons | | Millimicrons | |
| None | 284 | 1,050 | Above 500 | |
| 1 Ejection Under Constant Pressure of 15,000# | 173 | 980 | 240 | 183 |

*Example VIII*

Anatase raw pigment prepared by hydrolysis of titanium sulfate solution was mixed with rutile raw pigment prepared by the hydrolysis of titanium chloride solution to give an aqueous suspension containing 250 grams TiO₂ per liter and containing rutile and anatase in the ratio by weight of 1:10. The slurry was ground in a Travis Disper mill. The ground slurry was recirculated through the mill for a period of 30 minutes. Substantial reduction in particle size of the seeded raw pigment was effected by the colloid mill grinding. The product obtained by calcination of the ground mixture at a temperature giving complete conversion to rutile was also characterized by relatively low particle size. Average radius for the ground product before calcination was 212 millimicrons compared with 262 millimicrons for the unground product. The average radius of the ground product after calcination at 975° was 225 millimicrons and its tinting strength was 172 compared with 150 for commercial anatase.

The tinting strength and hiding power values given above were determined by the methods described in U. S. Patent 2,213,542, dated September 3, 1940.

The particle size values given were obtained by a turbidimetric method calibrated by the ultracentrifuge, the latter being described in U. S. Patent 2,062,134.

By the terms "raw pigment particles" or "secondary particles" we refer to the units into which either freshly precipitated or dried raw TiO₂ pigment can be dispersed by moderate milling in a mortar with some appropriate vehicle such as glycerol. Each of these raw pigment particles is made up of a large number of smaller or "primary particles." The secondary particles can be dispersed to give a suspension of the primary particles by neutralizing the residual sulfuric acid in the raw pigment, washing out the soluble sulfates and addition of a monobasic acid such as hydrochloric or nitric acid to the desulfated raw pigment. By the terms "disintegrated" or "mechanically reduced" raw pigment we refer to the product which results from our contemplated milling or grinding treatment of a raw pigment TiO₂ hydrolysate or precipitate. "Finished pigment particles" or "calcined pigment particles" comprise the units into which the calcined pigment can be dispersed by mulling with an appropriate vehicle such as an alkyd resin or glycerol.

While the invention has been described as applied to certain preferred embodiments thereof in which specific types of raw pigment precipitates, seeding agents, amounts, ratios, temperatures, volumes, etc., have been employed, it is not to be considered as limited thereto. As already stated, the invention broadly contemplates the manufacture of improved titanium oxide pigments, whether in the anatase or rutile crystalline modification or comprising mixtures of both modifications. For the purpose, it contemplates the treatment of all types of raw TiO₂ pigment precipitates or hydrolysates, and especially those resulting from U. S. Reissue Patents 18,854 or 18,790, or from U. S. Patent 1,851,487. It is especially effective for obtaining an improved rutile titanium oxide pigment through conversion of disintegrated raw anatase by calcination in the presence of a rutile seeding agent or promoter. It is especially useful for obtaining an improved rutile pigment through conversion at a relatively low calcination temperature of a disintegrated form of purified raw pigment anatase precipitated from the hydrolysis of a titanium sulfate solution and for converting reduced, seeded anatase raw pigment having particles or secondary aggregates of average radius in a range such that when the raw pigment is calcined in the presence of a small amount of an alkali metal salt, at a temperature adapted to give complete conversion to rutile, the calcined product is characterized by having optimum hiding power and tinting strength characteristics.

Although we refer to the use of specific TiO₂ slurry concentrations during wet grinding, ranging from substantially 250–300 g./l., these are merely preferred. In most practical applications, the use of slurries containing from about 100–350 g. TiO₂ per liter will be found to be advantageously useful in the invention. Although the use of higher and lower TiO₂ concentrations is contemplated, it will be found that when the concentration ranges above about 450 g. TiO₂ per liter, relatively viscous slurries result, and hence such concentrations are not recommended if optimum results are desired in the invention. Similarly, although concentrations below 100 g./l. are contemplated as employable herein, the greater amount of mill capacity which such concentrations require renders their use in the invention less practical and satisfactory. Hence, such lower concentrations are not recommended, if it is desired to derive optimum benefits in the invention.

Likewise, though we prefer to utilize calcination temperatures ranging from substantially 850 to 975° C., and not in excess of 1000° C. to insure the procurance of optimum benefits and advantages under the invention and production of a final pigment which is essentially all rutile and possesses optimum values for tinting strength, hiding power and particle size, the invention is not limited to the indicated lower limit of specified temperature. The use of any particular calcination temperature will obviously depend upon the nature of the TiO₂ precipitate under treatment and the particular properties and extent of rutile crystallinity which it is desired that the final product shall exhibit. In general, it will be found that temperatures ranging from substantially 750 to 1000° C. may be usefully and effectively employed in the invention.

Although we have described our invention as particularly adaptable for the manufacture of straight or unextended forms of anatase or rutile titanium oxide pigments, it will be obvious that extended forms of such pigments may be readily produced herein. Thus, various inorganic extenders, such as barium or calcium sulfate, calcium carbonate or magnesium silicate, may be suitably blended with or precipitated upon the TiO₂ pigment during the course of its manufacture, processing or finishing in accordance with our invention.

Since different raw pigments will vary to some extent in their particle size and the conditions of hydrolysis precipitation may profoundly affect the raw pigment from the standpoint of the degree to which its particle size is reduced by a given treatment, the extent of required milling, grinding and ejection treatment in accordance with our invention to obtain a raw pigment which, when subsequently calcined, exhibits optimum particle size values, is obviously variable. Thus, the time of disintegrating treatment may vary from a relatively short time (say, about 1 hour), to a relatively long time (say, 100 hours). While longer grinds are more effective in reducing particle size, they may, in some instances, be disadvantageous if carried out for protracted periods, especially from the standpoint of contaminating the raw or undeveloped pigment with the material present in the balls or pebbles employed in the grinding.

In reducing particle size by dry grinding or by dry grinding followed by wet grinding, preferably, the raw pigment is first dried to remove the major portion of the moisture from the wet cake, drying temperatures ranging from about 50–200° C. being useful for the purpose. Products dried at the lower temperatures (below about 125° C.) appear to undergo greater reduction in particle size during subsequent dry grinding than those dried at higher temperatures. Hence, the use of these lower drying temperatures is preferred. The grinding cycle will be found to be relatively important in the dry plus wet grinding process. The time of dry grinding is preferably from about 1–4 hours, but may vary over wider limits; e. g., from about 15 minutes to about 24 hours. Dry grinding for more extensive periods may result in products lacking in desired uniformity of particle size and hence we prefer to avoid such extended dry grinding periods. The wet grind following the dry grind is preferably made at a convenient slurry consistency and the period of wet grinding may vary from a very short period, say, from 5 minutes to several hours, 1–3 hours having been found to comprise a most practical and effective length of time for the wet grinding or milling operation.

In reducing particle size by ejection of aqueous suspensions through a small orifice under high fluid pressure, the pressure under which the suspension is ejected will be found to be important and critical. Pressures of the order of 2000 pounds per square inch are useful when only moderate reduction in particle size is desired. To effect greater reduction in raw pigment particle size, higher pressures must be resorted to. Pressures of the order of 10,000–15,000 pounds per square inch have been found most advantageous and are therefore preferred. In general, several ejections at one pressure will usually accomplish the same result as one ejection at a somewhat higher pressure. Thus, 5 ejections at 7500 pounds pressure produce reduction in particle size about equivalent to one ejection at 12,000 pounds. However, the greatest efficiency is obtained by a single ejection at the required pressure since the percentage reduction in size for several successive ejections decreases with each ejection. In its broader aspects, the use in the invention of fluid pressures within a range of from, say, 1000 to 20,000 pounds per square inch, is contemplated.

While the invention has been illustratively described in its application to so-called "batch," as distinguished from "continuous," types of milling or extruding apparatus, it will be understood that raw pigment disintegration may be advantageously effected in such continuous types of media, whereby milling, grinding or ejection of the precipitated raw pigment through a restricted orifice may be effected by a continuous pumping or recycling operation, as distinguished from the batch type of the examples. Obviously, such continuous types of operations are usually more feasible and economical in handling large quantities of materials. Also, the raw pigment under treatment may be disintegrated under room or atmospheric temperatures as well as at elevated temperatures or superatmospheric pressure.

As will be evident from the foregoing, one can readily obtain by our invention an improved form of titanium oxide pigment, and especially rutile; that the latter can be produced by conversion of anatase and without resorting to the undesirably high conversion temperatures required heretofore and which incur objectionable sintering which adversely affects the color, uniformity, particle size, texture, tinting strength and hiding power of the final product. Due to such excessively high temperatures, prior rutile converted products are characteristically coarse and gritty in nature and prior to use it has been necessary to subject them to expensive and prolonged grinding treatments in an effort to reduce, at least to some degree, the size of these aggregates and hard particles. This has not proved entirely satisfactory or effective. By our invention these disadvantages are remedied and a direct process is provided for obtaining a pigment which inherently possesses optimum particle size and tinting strength values, is of desirably soft, smooth texture, and exhibits excellent hiding power and color characteristics with relatively complete freedom from objectionable coarse particles or sintered aggregates.

As will be further evident, the invention affords a novel method for effecting a substantial reduction in the average particle size of a calcined titanium oxide pigment, whether that pigment is in the anatase or rutile modification or comprises a mixture of both crystalline forms. For example, whereas prior calcined, converted rutile pigments have been characterized by an average radii of the order of 300 millimicrons or above, those obtained in our invention are characteristically lower in size, well below 300 millimicrons, and more near 200 millimicrons. Consequently, our pigments being within an optimum particle size range inherently exhibit maximum hiding power, tinting strength and other essential pigment properties. Further, the invention is especially adaptable for processing anatase raw pigment or seeded anatase raw pigment to provide an undeveloped pigment product having particles or secondary aggregates of average radius in a range such that when the disintegrated raw pigment is calcined in the presence of a small amount of an alkali metal salt at a temperature which gives relatively complete conversion to rutile, the calcined product is characterized by average radius in the range of about 140–225 millimicrons.

We claim as our invention:

1. A process for producing an improved rutile titanium oxide pigment comprising subjecting, prior to heat treatment to develop its pigment properties anatase raw pigment titanium oxide to mechanical disintegration treatment to reduce the particle size thereof, and then calcining the disintegrated raw pigment in the presence of a titanium-oxygen compound rutile conversion promoter in order to develop essential pigmentary properties in said raw pigment and substantially convert the same to rutile.

2. A process for producing an improved rutile titanium oxide pigment comprising subjecting, prior to heat treatment to develop its pigment properties precipitated anatase raw pigment to mechanical disintegration treatment to reduce the particle size thereof, and thereafter calcining the reduced product in the presence of a small amount of a rutile conversion promoter comprising precipitated raw pigment rutile, in order to develop essential pigment properties and convert said anatase to substantially rutile.

3. A process for obtaining an improved rutile titanium oxide pigment exhibiting optimum values in respect to particle size and tinting strength which comprises subjecting, prior to heat treatment to develop its pigment properties a relatively pure, anatase raw $TiO_2$ pigment hydrolysate obtained from the hydrolysis of a titanium sulfate solution to mechanical disintegration treatment in order to reduce the particle size of said raw pigment and then calcining the reduced product at a temperature not in excess of substantially 1000° C. in the presence of a minor amount of precipitated raw rutile pigment.

4. A process for obtaining an improved rutile titanium oxide pigment by conversion of anatase which comprises subjecting, prior to heat treatment to develop its pigment properties a mixture of anatase raw pigment and a minor amount of raw pigment rutile to mechanical disintegration treatment in order to reduce the particle size of said raw pigment mixture, and thereafter calcining the mixture of reduced raw pigment at temperatures ranging from substantially 750–1000° C.

5. A process for obtaining an improved rutile titanium oxide pigment through conversion of precipitated raw anatase pigment which comprises subjecting, prior to heat treatment to develop its pigment properties a raw pigment anatase hydrolysate obtained from the hydrolysis of a titanium sulfate solution to mechanical disintegration treatment in order to reduce the particle size thereof and thereafter calcining the disintegrated product at a temperature ranging from substantially 750–1000° C. in the presence of from about 1 to 25 parts of raw pigment rutile per 100 parts of disintegrated raw pigment anatase.

6. A process for obtaining an improved, calcined, rutile titanium oxide pigment having a particle size characterized by an average radius in the range of about 140–225 millimicrons, which comprises subjecting, prior to heat treatment to develop its pigment properties a raw pigment anatase hydrolysate from the hydrolysis of a titanium sulfate solution to mechanical disintegration treatment, in order to reduce the particle size thereof, and thereafter calcining the disintegrated product at a temperature ranging from substantially 750 to 1000° C. in the presence of a small amount of an alkali metal salt and from about 1–25 parts of raw pigment rutile per 100 parts of disintegrated raw pigment anatase.

7. A process for obtaining an improved, calcined, rutile-converted titanium oxide pigment having a particle size average radius in the range of from about 140–225 millimicrons, comprising subjecting, prior to heat treatment to develop its pigment properties raw pigment anatase from the hydrolysis of a titanium sulfate solution to mechanical disintegration treatment to reduce the particle size thereof, and thereafter calcining the resulting disintegrated raw pigment at a temperature ranging from substantially 750 to about 1000° C. in the presence of from about .5 to 1% of sodium sulfate and from about 2–10 parts of raw pigment rutile per 100 parts of the disintegrated raw pigment anatase present.

8. A process for obtaining an improved, calcined, rutile-converted titanium oxide pigment having a particle size average radius in the range of from about 140–225 millimicrons, comprising subjecting, prior to heat treatment to develop its pigment properties raw pigment anatase from the hydrolysis of a titanium sulfate solution to mechanical disintegration treatment to reduce the particle size thereof, and thereafter calcining the resulting disintegrated raw pigment at a temperature ranging from substantially 750 to about 1000° C. in the presence of from about .5 to 1% of potassium sulfate and from about 2–10 parts of raw pigment rutile per 100 parts of the disintegrated raw pigment anatase present.

JOHN LEWIS KEATS.
JAMES HOWARD PETERSON.

REFERENCES CITED

The following references are of record in the file of this patent:

UNITED STATES PATENTS

| Number | Name | Date |
|---|---|---|
| 1,922,328 | Rhodes | Aug. 15, 1933 |
| 1,995,580 | Rockstrok et al. | Mar. 26, 1935 |
| 2,034,923 | Schmidt | Mar. 24, 1936 |
| 2,062,134 | Kubelka | Nov. 24, 1936 |
| 2,133,941 | Allan | Oct. 25, 1938 |
| 2,273,431 | Booge | Feb. 17, 1942 |
| 2,290,539 | Cole | July 31, 1942 |